United States Patent
Kruglick

(10) Patent No.: US 9,692,833 B2
(45) Date of Patent: Jun. 27, 2017

(54) DEVICE AND SESSION IDENTIFICATION

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 102 days.

(21) Appl. No.: 14/359,247

(22) PCT Filed: Jul. 26, 2013

(86) PCT No.: PCT/US2013/052305
§ 371 (c)(1),
(2) Date: May 19, 2014

(87) PCT Pub. No.: WO2015/012865
PCT Pub. Date: Jan. 29, 2015

(65) Prior Publication Data
US 2015/0326674 A1 Nov. 12, 2015

(51) Int. Cl.
*G06F 15/173* (2006.01)
*H04L 29/08* (2006.01)
(Continued)

(52) U.S. Cl.
CPC ............ *H04L 67/146* (2013.01); *H04L 43/04* (2013.01); *H04L 61/2007* (2013.01);
(Continued)

(58) Field of Classification Search
CPC . G06F 21/552; H04L 63/168; H04L 63/1441; H04L 29/08675; H04L 29/08594; H04L 29/08621
(Continued)

(56) References Cited

U.S. PATENT DOCUMENTS 8,428,038 B1   4/2013  Buttles
9,038,148 B1*  5/2015  Roth ............... H04L 67/146
                                                          726/5
(Continued)

FOREIGN PATENT DOCUMENTS

KR    1020050088084 A   9/2005
WO       2004084097 A1   9/2004

OTHER PUBLICATIONS

"Antivirus Software Performs Poorly Against New Threats," accessed at http://web.archive.org/web/20130705003953/http://it.slashdot.org/story/13/01/02/0348247/antivirus-software-performs-poorly-against-new-threats, accessed on Apr. 1, 2014, pp. 1-27.
(Continued)

*Primary Examiner* — James Conaway
(74) *Attorney, Agent, or Firm* — Moritt Hock & Hamroff LLP; Steven S. Rubin, Esq.

(57) ABSTRACT

Technologies are generally described for systems, methods, and devices for implementing device and session identification. In some examples, a processor may receive a first communication from a device. The first communication may include requests to interact with a web page, a session identifier associated with the first communication, and a protocol address associated with the device. The processor may receive a second communication from the device. The second communication may include a device identifier associated with the device, where the device identifier may be different from the internet protocol address, and the session identifier. The processor may link the first communication with the device identifier based on the session identifier. The processor may further analyze the first communication with respect to the device identifier to produce an analyzed first communication.

18 Claims, 5 Drawing Sheets

(51) Int. Cl.
*H04L 29/12* (2006.01)
*H04L 12/26* (2006.01)
*H04L 29/06* (2006.01)

(52) U.S. Cl.
CPC ........ *H04L 67/10* (2013.01); *H04L 29/08594* (2013.01); *H04L 29/08621* (2013.01); *H04L 29/08675* (2013.01); *H04L 63/1441* (2013.01); *H04L 63/168* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 9,124,629 | B1* | 9/2015 | Bowen | H04L 63/168 |
| 2006/0264201 | A1* | 11/2006 | Zhang | H04L 29/12783 455/411 |
| 2007/0130429 | A1* | 6/2007 | Cunningham | H04L 12/4641 711/147 |
| 2009/0164269 | A1 | 6/2009 | Gupta et al. | |
| 2010/0202362 | A1 | 8/2010 | Harikumar et al. | |
| 2010/0229224 | A1* | 9/2010 | Etchegoyen | G06F 21/31 726/5 |
| 2011/0246651 | A1* | 10/2011 | Djabarov | G06F 11/3495 709/224 |
| 2011/0302653 | A1* | 12/2011 | Frantz | G06F 21/552 726/22 |
| 2012/0158978 | A1 | 6/2012 | Narayana et al. | |
| 2012/0236846 | A1 | 9/2012 | Ku | |
| 2013/0226692 | A1* | 8/2013 | Kouladjie | G06Q 30/02 705/14.45 |
| 2014/0223011 | A1* | 8/2014 | Smith | H04L 47/762 709/226 |
| 2014/0297767 | A1* | 10/2014 | Yasuie | H04L 63/123 709/206 |
| 2015/0095990 | A1* | 4/2015 | Ranganathan | G06F 21/33 726/4 |
| 2015/0170164 | A1* | 6/2015 | Marsico | G06Q 30/0201 235/375 |

OTHER PUBLICATIONS

"Bamital Bites the Dust," accessed at http://web.archive.org/web/20130625074539/http://www.symantec.com/connect/blogs/bamital-bites-dust, Feb. 6, 2013, pp. 1-4.
"Host-based intrusion detection system," accessed at http://web.archive.org/web/20130430232952/http://en.wikipedia.org/wiki/Host-based_intrusion_detection_system, accessed on Apr. 1, 2014, pp. 1-5.
"Microsoft says 'botnet' hacker hijacked online searches," accessed at http://web.archive.org/web/20130215082920/http://www.rawstory.com/rs/2013/02/07/microsoft-says-botnet-hacker-hijacked-online-searches/, Feb. 7, 2013, pp. 1-2.
"Nielsen, M., Why Bloom filters work the way they do," accessed at http://web.archive.org/web/20130602201839/http://www.michaelnielsen.org/ddi/why-bloom-filters-work-the-way-they-do/, Sep. 26, 2012, pp. 1-12.
"Polymorphic code," accessed at http://web.archive.org/web/20130309165017/https://en.wikipedia.org/wiki/Polymorphic_code, accessed on Apr. 1, 2014, pp. 1-4.
Felt, A.P., et al., "A Survey of Mobile Malware in the Wild," In Proceedings of the 1st ACM Workshop on Security and Privacy in Smartphones and Mobile Devices, 2011, pp. 3-14.
Kruegel, C., and Vigna, G., "Anomaly detection of web-based attacks," Proceedings of the 10th ACM conference on Computer and communications security, 2003, pp. 251-261.
Marshall, J., "Device Fingerprinting Finally Arrives," accessed at http://web.archive.org/web/20130307232902/http://www.digiday.com/mobile/device-fingerprinting-finally-arrives, Feb. 2, 2012, pp. 1-2.
Perera, K.S. et al., "A Novel Ensemble Learning-based Approach for Click Fraud Detection in Mobile Advertising," Mining Intelligence and Knowledge Exploration, 2013, pp. 370-382, vol. 8284.
Perlroth, N., "Outmaneuvered at Their Own Game, Antivirus Makers Struggle to Adapt," accessed at http://web.archive.org/web/20130101053820/http://www.nytimes.com/2013/01/01/technology/antivirus-makers-work-on-software-to-catch-malware-more-effectively.html, Dec. 31, 2012, pp. 1-3.
Robertson, W., et al., "Using generalization and characterization techniques in the anomaly-based detection of web attacks," Proceedings of the 13th Symposium on Network and Distributed System Security (NDSS), Feb. 2006, pp. 1-15.
Strazzere, T., "Security Alert: HongTouTou, New Android Trojan, Found in China," accessed at https://blog.lookout.com/blog/2011/02/15/security-alert-hongtoutou-new-android-trojan-found-in-china/, Feb. 15, 2011, pp. 1-6.
Perera, K. S. et al., "A novel approach based on ensemble learning for fraud detection in mobile advertising", JMRL: Workshop and Conference Proceedings, ACML 2012, p. 1-10.
International Search Report and Written Opinion for application PCT/US13/52305, dated Feb. 7, 2014, 16 pages.
Extended European Search Report for European Application No. 13889955.4 mailed on Apr. 5, 2017.

* cited by examiner

DEVICE AND SESSION IDENTIFICATION

CROSS-REFERENCE TO RELATED APPLICATION

This application is a U.S. National Stage filing under 35 U.S.C. §371 of International Application No. PCT/US13/52305, filed on Jul. 26, 2013, the entirety of which is hereby incorporated by reference.

BACKGROUND

Unless otherwise indicated herein, the materials described in this section are not prior art to the claims in this application and are not admitted to be prior art by inclusion in this section.

Wireless devices may be used in telecommunications. Wireless devices commonly provide services that may be impractical or impossible with the use of wires. Wireless devices use some form of energy (e.g., radio waves) to transfer information without the use of wires. Wireless devices may transfer information over both short and long distances.

SUMMARY

According to some examples, methods for analyzing a first communication from a device are generally described. The methods may include a processor receiving the first communication from the device. The first communication may include requests to interact with a web page, a session identifier associated with the first communication, and a protocol address associated with the device. The methods may include receiving a second communication from the device. The second communication may include a device identifier associated with the device, where the device identifier may be different from the internet protocol address, and the session identifier. The methods may include linking the first communication with the device identifier based on the session identifier. The methods may include analyzing the first communication with respect to the device identifier to produce an analyzed first communication.

According to other examples, methods for sending a first communication are generally described. The methods may include a device sending the first communication from the device to a processor. The processor may be at a first internet protocol address. The first communication may include requests to interact with a web page, a session identifier associated with the first communication, and a second internet protocol address associated with the device. The methods may include generating a device identifier for the device different from the second internet protocol address. The methods may include sending a second communication from the device to the processor. The second communication may include the device identifier and the session identifier.

According to further examples, systems configured to analyze a first communication from a device are generally described. The systems may include the device, where the device includes a first processor, and a second processor configured to be in communication with the device over a network. The first processor may be configured to send the first communication from the device to the second processor. The second processor may be at a first internet protocol address. The first communication may include requests to interact with a web page, a session identifier associated with the first communication, and a second internet protocol address associated with the device. The first processor may generate a device identifier for the device, different from the second internet protocol address. The first processor may send a second communication from the device to the second processor at the first internet protocol address. The second communication may include the device identifier and the session identifier. The second processor may be configured to receive the first communication from the device and receive the second communication from the device. The second processor may link the first communication with the device identifier based on the session identifier. The second processor may analyze the first communication with respect to the device identifier to produce an analyzed first communication.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
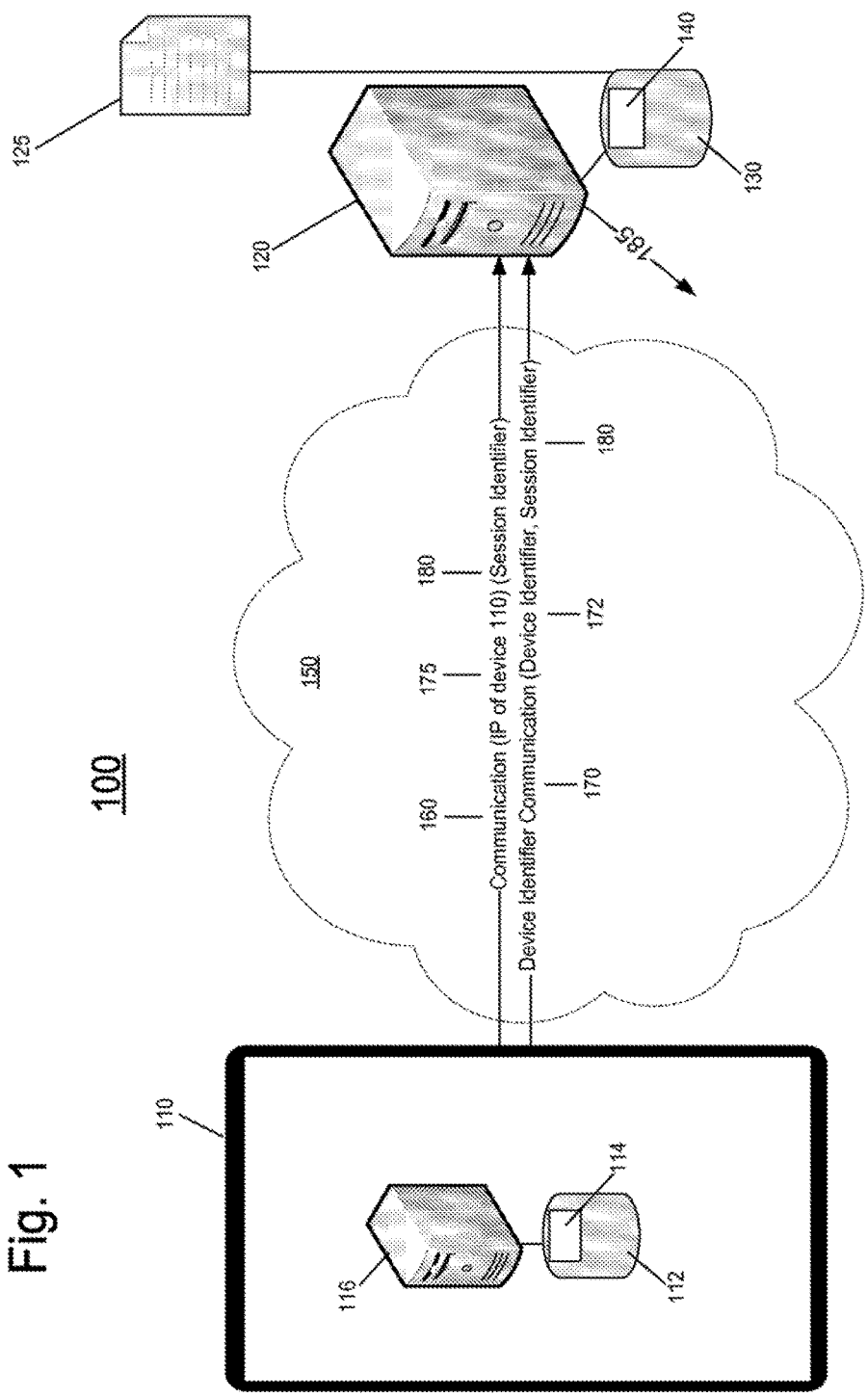
FIG. 1 illustrates an example system that can be utilized to implement device and session identification.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies including methods, apparatus, systems, devices, and computer program products related to device and session identification.

Briefly stated, technologies are generally described for systems, methods, and devices for implementing device and session identification. In some examples, a processor may receive a first communication from a device. The first communication may include requests to interact with a web page, a session identifier associated with the first communication, and a protocol address associated with the device. The processor may receive a second communication from the device. The second communication may include a device identifier associated with the device, where the device identifier may be different from the internet protocol address, and the session identifier. The processor may link the first communication with the device identifier based on the session identifier. The processor may further analyze the first communication with respect to the device identifier to produce an analyzed first communication.

FIG. 1 illustrates an example system 100 that can be utilized to implement device and session identification, arranged in accordance with at least some embodiments presented herein. System 100 may include a device 110, a network 150 and a processor 120. Processor 120 may be operated by, for example, a search engine, an advertiser, an advertising network, or other suitable entity. Processor 120 may include one or more processing elements disposed in one or more housings. Device 110 may include a processor 116 in communication with a memory 112. Memory 112 may include instructions 114. Processor 120 may be in communication with a memory 130 including instructions 140. Device 110 may be a cell phone, tablet device, wearable device such as GOOGLE GLASS, or any other wireless communication device. Network 150 may be a cellular network, a WIFI network, the Internet or any other network.

As explained in more detail below, processor 116 may send a communication 160 from device 110 to an internet protocol address ("IP") associated with processor 120 over network 150. Communication 160 may include a session identifier 180 and an IP address 175 associated with device 110. Session identifier 180 may include any information that may identify communication 160. In some examples, session identifier 180 may include an identifier used in hypertext transfer protocol (HTTP) communications. In an example, communication 160 may relate to a request or requests to access and interact with a web page 125 stored in memory 130. Processor 116 may, by executing instructions 114, determine that communication 160 is associated with a group of services such as advertising or search services. The determination may be made based the IP address or Uniform Resources Locator ("URL") associated with processor 120. In response to this determination, processor 116 may send a device identifier communication 170 to processor 120 over network 150. Device identifier communication 170 may be generated by an application program interface ("API") provided by an entity associated with processor 120. Device identifier communication 170 may include session identifier 180 and a device identifier 172. As explained further herein, device identifier 172 may enable processor 120 to perform more detailed analysis on communication 160.

Processor 120 may receive communication 160, session identifier 180 and device identifier communication 170. Processor 120 may link device identifier 172 and communication 160. Linking may be performed by matching session identifier 180 in communication 160 with session identifier 180 in device identifier communication 170. Processor 120 may analyze communication 160 linked to device identifier 172 to produce analyzed communication 185. For example, processor 120 may compare analyzed communication 185 with other communications, such as prior analyzed communications, associated with device identifier 172. Processor 120 may also generate analytics for communication 160 linked with device identifier 172 to detect malware induced click fraud. In an example, processor 120 may detect malware induced click fraud when multiple communications are detected as being from the same device when communication 160 includes two or more different IP addresses.

For example, communication 160 may include requests for interactions with a web page 125. In an example where device 110 includes malware, communication 160 may include multiple, perhaps fraudulent, clicks and/or requests on web page 125. Malware, such as botnets, may operate on a device, may open a network session, and may produce fraudulent clicks. Such requests may inappropriately result in click fraud or inappropriately increase search engine optimization rankings. In part by linking communication 160 with device identifier communication 170, processor 120 may be able to detect click fraud. Processor 120 may then make a decision whether to disavow a click.

Figure 2:
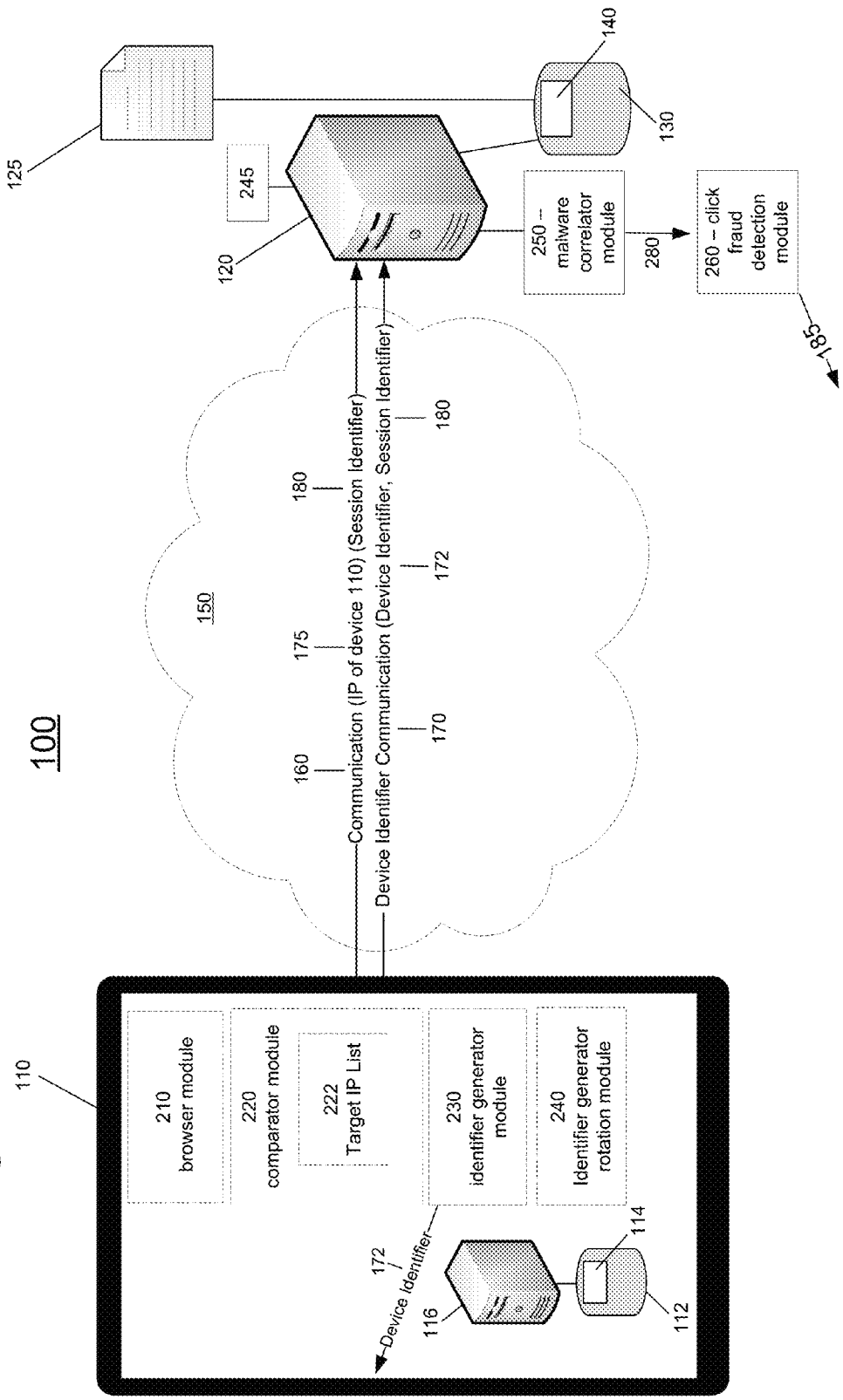
FIG. 2 illustrates the example system of FIG. 1 depicting further details regarding device and session identification.

FIG. 2 illustrates example system 100 of FIG. 1 depicting further details relating to device and session identification, arranged in accordance with at least some embodiments presented herein. System 100 of FIG. 2 is substantially similar to system 100 of FIG. 1, with additional details. Those components in FIG. 2 that are labeled identically to components of FIG. 1 will not be described again for the purposes of clarity.

As depicted, device 110 may include a browser module 210, a comparator module 220, an identifier generator module 230 and/or an identifier generator rotation module 240. Comparator module 220 may include a target internet protocol ("IP") list 222. Processor 116 may include and/or be in communication with browser module 210, comparator module 220, identifier generator module 230 and/or identifier generator rotation module 240. In an example, comparator module 220 may be a Bloom filter. Identifier generator module 230 may be a random number generator. Processor 120 may include, or be in communication with, malware correlator module 250 and/or click fraud detection module 260. Modules may be implemented in hardware or software.

Focusing on device 110 and processor 116, browser module 210 may be used to interface with a website operated by processor 120. For example, browser module 210 may be used to send a request to a URL or IP address associated with processor 120 and/or web page 125. Processor 116 may send communication 160 over network 150 to processor 120. Processor 120 may be associated with an IP address 245.

Processor 116 may use comparator module 220 and compare IP address 245, associated with processor 120, with target IP list 222 of IP addresses. Target IP list 222 may identify URLs or IP addresses associated with search services or advertising. In an example, processor 116 may, through use of comparator module 220, determine that IP address 245 is associated with advertising or search services. For example, target IP list 222 may include a list of URLs or IP addresses associated with advertising or search services. In response to the determination that IP address 245 matches at least one entry in target IP list 222, processor 116 may execute identifier generator module 230. Identifier generator module 230 may generate device identifier 172 that is associated with device 110. In response to identifier generator module 230 generating device identifier 172, processor 116 may send device identifier communication 170, including device identifier 172 and session identifier 180, to processor 120.

Identifier generator rotation module 240 may include instructions to instruct identifier generator module 230 to generate an updated device identifier 172 based on a schedule. The schedule for update may be, for example, once a day, after change of a user login, or upon a reboot of device 110. Among other benefits, by changing the device identifier based on a schedule, identifier generator rotation module 240 may preserve a privacy of a user of device 110. Device identifier 172 may identify device 110 for a finite amount of time and, as such, may be used to detect repeated communications from device 110. Device identifier 172 may provide processor 120 with information that communications are sent from the same device. Device identifier 172 may avoid including specific information related to device 110.

Processor 120 may receive communication 160 from processor 116, including session identifier 180 and IP address 175. Processor 120 may receive device identifier communication 170 from processor 116, including device identifier 172 and session identifier 180. Processor 120 may execute malware correlator module 250 on communication 160 and device identifier communication 170. Malware correlator module 250 may link communication 160 with device identifier 172 to produce linked communication 280. Malware correlator module 250 may link communication 160 with device identifier 172 by matching session identifier 180 from both communication 160 and device identifier communication 170. Processor 120 may execute click fraud detection module 260 on linked communication 280 to produce analyzed communication 185. Click fraud detection module 260, may analyze linked communication 280. This analysis may determine if linked communication 280 includes fraudulent clicks. Fraudulent clicks in linked communication 280 may identify fraudulent clicks in communication 160 as linked communication 280 includes communication 160 linked with device identifier 172.

Click fraud detection module 260 may have one or more criteria for determining whether linked communication 280 includes fraudulent clicks. These criteria may include, evaluating patterns and repetition of clicks in linked communication 280. These criteria may also include a comparison with a collected history of communications which may include identified communications associated with device identifier 172. In one example, processor 120 may send linked communication 280, analyzed as containing fraudulent clicks, to other search engines or advertisers to be used for comparison.

Among other possible benefits, a system in accordance with the present disclosure may be used to identify fraudulent clicks on a web site received from a mobile device. A mobile device may not have a fixed internet protocol address and click fraud prevention systems typically associate communication sessions with internet protocol addresses to identify machines that repeatedly fake user clicks. A system in accordance with the present disclosure may associate communication sessions from a mobile device, even from multiple IP addresses, by providing a device identifier for the device along with the session identifier. Advertising click fraud, such as fake user clicks on advertising located on websites, as well as search engine optimization click fraud, such as clicks to manipulate search engine results, from mobile devices may be identified and prevented.

In another possible benefit, malware for mobile devices may decrease as the benefits for infecting mobile devices may be diminished. A device identifier may provide click fraud detection systems a way to identify a mobile device comparable to how an internet protocol address may be used to identify a desktop machine. The mobile device may then become no more valuable for click fraud than a desktop machine.

Figure 3:
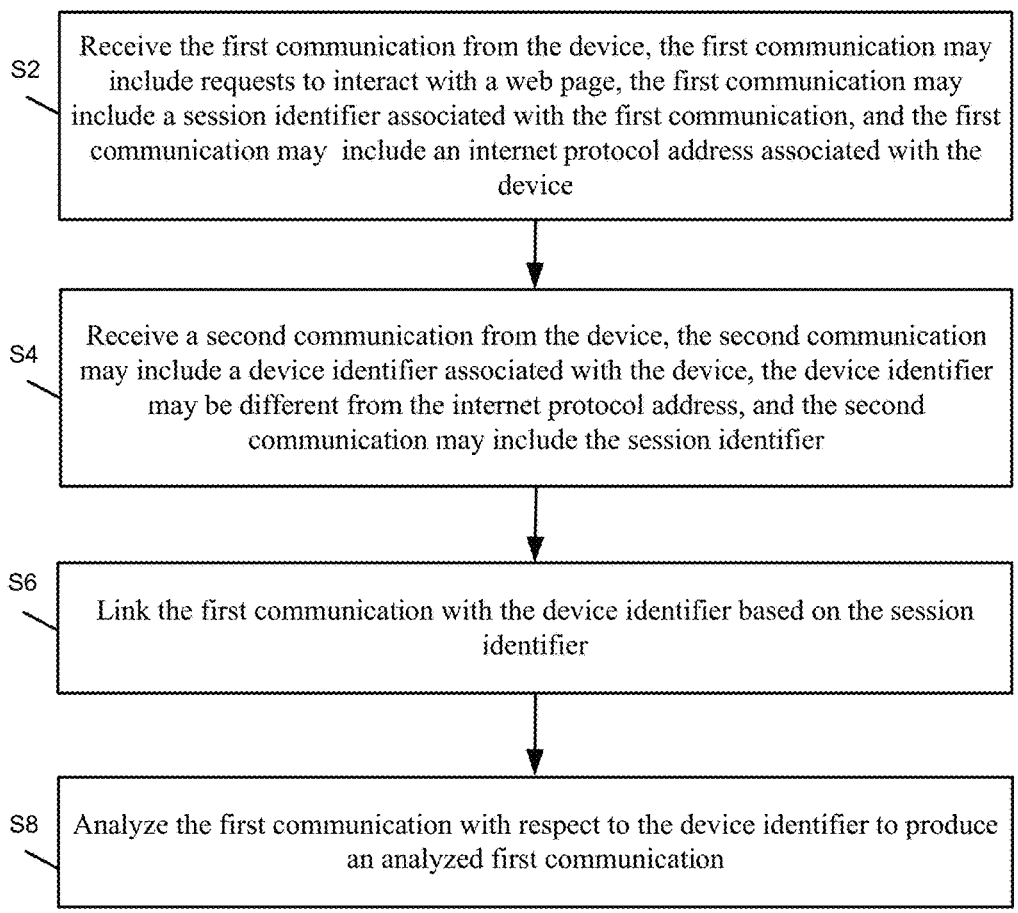
FIG. 3 illustrates a flow diagram for an example process for implementing device and session identification.

FIG. 3 illustrates a flow diagram for an example process for implementing device and session identification, arranged in accordance with at least some embodiments presented herein. The process in FIG. 3 could be implemented using, for example, system 100 discussed above. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation.

Processing may begin at block S2 "Receive the first communication from the device, the first communication may include requests to interact with a web page, the first communication may include a session identifier associated with the first communication, and the first communication may include an internet protocol address associated with the device." At block S2, the processor may receive the first communication from the device. The first communication may include a session identifier associated with the first communication. The session identifier may identify the communication to the processor. The first communication may also include an internet protocol address associated with the device.

Processing may continue from block S2 to block S4 "Receive a second communication from the device, the second communication may include a device identifier associated with the device, the device identifier may be different from the internet protocol address, and the second communication may include the session identifier." At block S4, the processor may receive a second communication from the device. The second communication may include a device identifier associated with the device. The device identifier may be different from the internet protocol address. The device identifier may be generated by a processor in the device in response to the device determining the internet protocol address is on a list. The second communication may also include the session identifier associated with the first communication.

Processing may continue from block S4 to block S6 "Link the first communication with the device identifier based on the session identifier." At block S6, the processor may link the device identifier from the second communication with the first communication. The processor may match the session identifier in the second communication with the session identifier in the first communication to link the device identifier from the second communication with the first communication.

Processing may continue from block S6 to block S8 "Analyze the first communication with respect to the device identifier to produce an analyzed first communication." At block S8, the processor may analyze the first communication with respect to the device identifier. The processor may analyze the first communication with respect to other communications that are associated with the device identifier.

Figure 4:
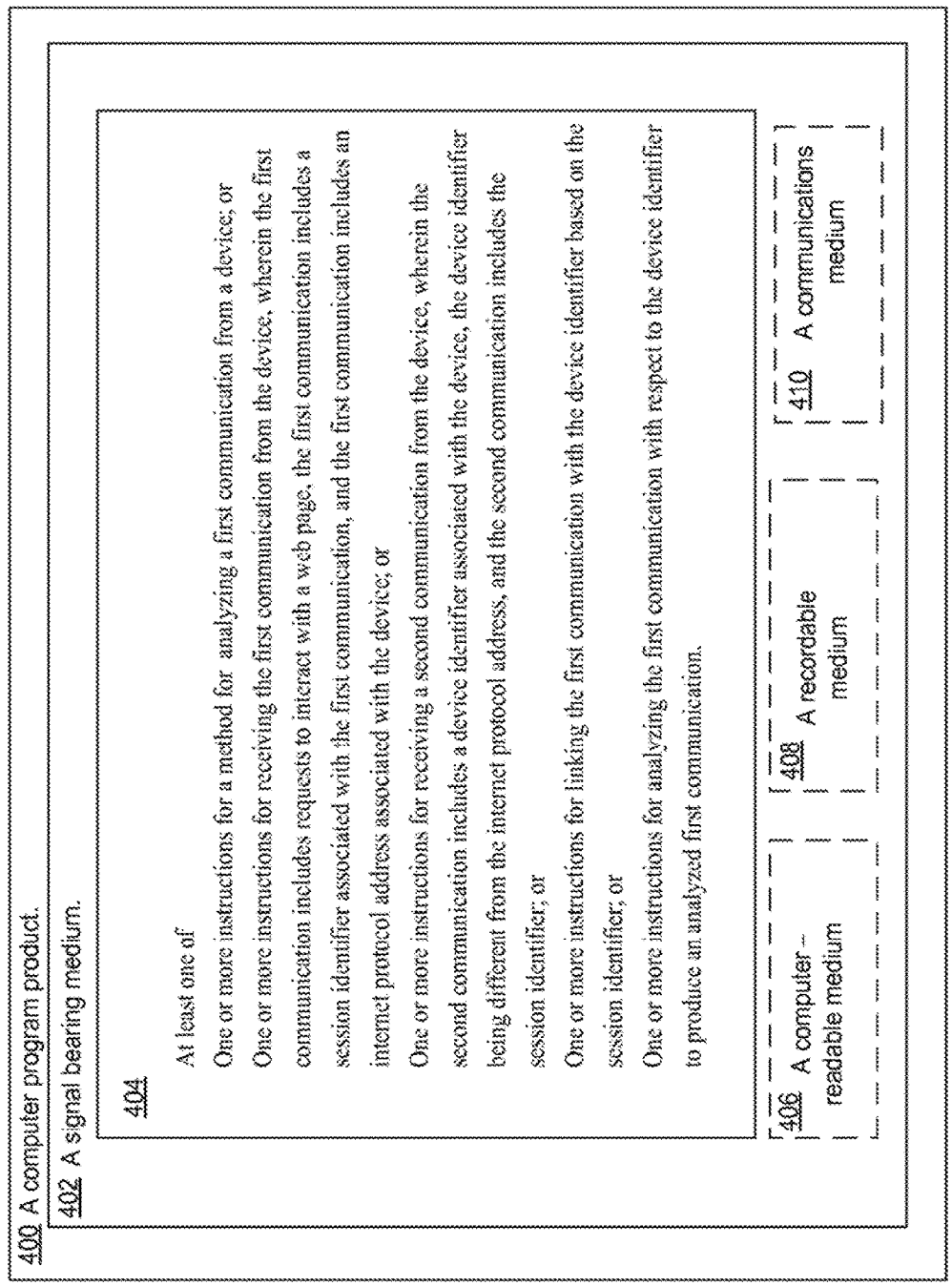
FIG. 4 illustrates computer program products effective to implement device and session identification.

FIG. 4 illustrates computer program products 400 effective to implement device and session identification arranged in accordance with at least some embodiments presented herein. Computer program product 400 may include a signal bearing medium 402. Signal bearing medium 402 may include one or more instructions 404 that, when executed by, for example, a processor, may provide the functionality described above with respect to FIGS. 1-3. Thus, for example, referring to system 100, processor 120 may undertake one or more of the blocks shown in FIG. 4 in response to instructions 404 conveyed to the system 100 by the signal bearing medium 402.

In some implementations, signal bearing medium 402 may encompass a computer-readable medium 406, such as, but not limited to, a hard disk drive (HDD), a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.). Thus, for example, the computer program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

Figure 5:
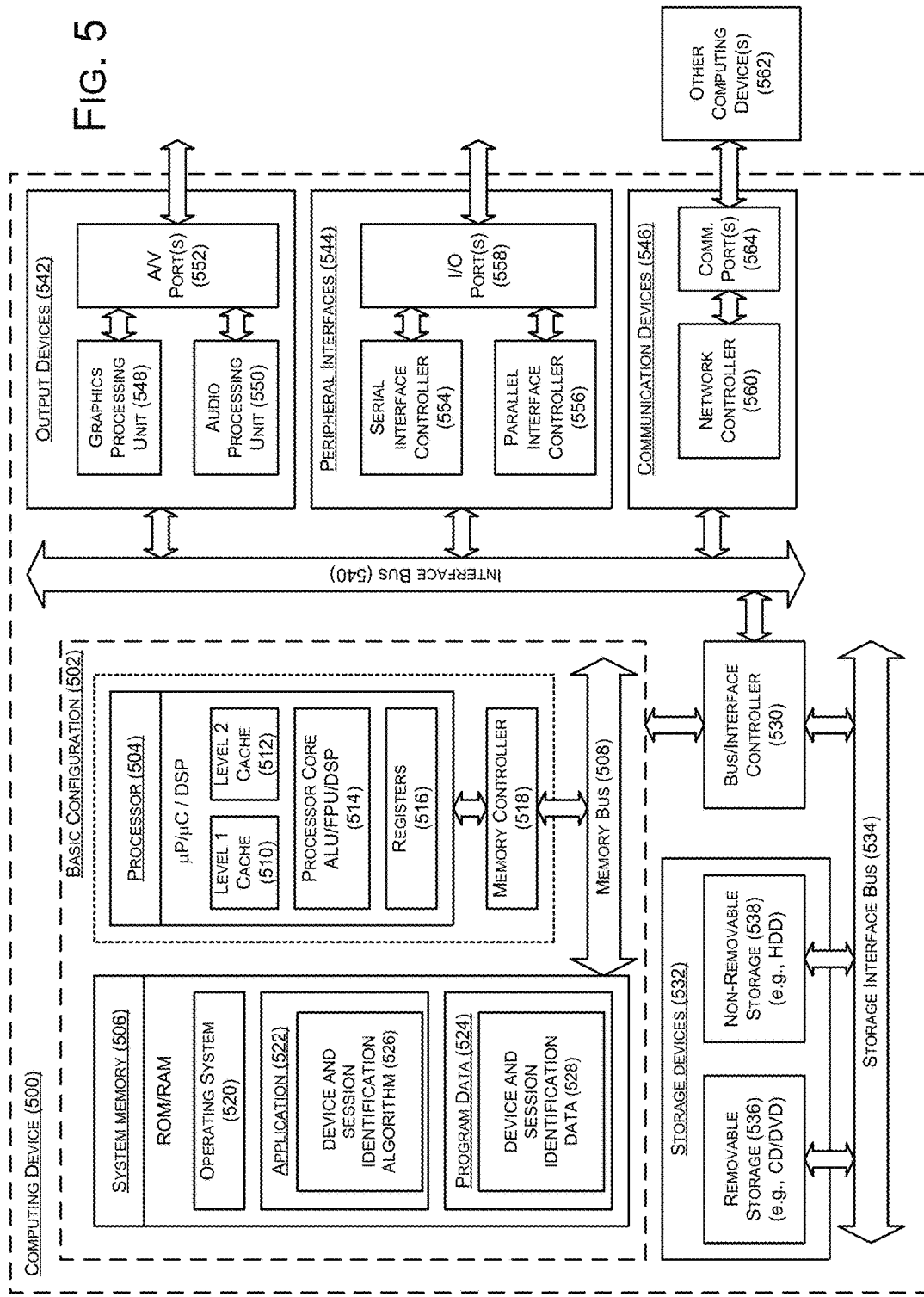
FIG. 5 is a block diagram illustrating an example computing device that is arranged to implement device and session identification, all arranged in accordance with at least some embodiments presented herein.

FIG. 5 is a block diagram illustrating an example computing device 500 that is arranged to implement device and session identification, arranged in accordance with at least some embodiments presented herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524.

Application 522 may include a device and session identification algorithm 526 that is arranged to perform the functions as described herein including those described previously with respect to FIGS. 1-4. Program data 524 may include device and session identification data 528 that may be useful for device and session identification as is described herein. In some embodiments, application 522 may be arranged to operate with program data 524 on operating system 520 such that device and session identification may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to analyze a first communication from a device, the method comprising, by a processor at a first internet protocol address:
   receiving the first communication from the device, wherein the first communication includes requests to interact with a web page, a session identifier that identifies the first communication, and a second internet protocol address associated with the device;
   receiving a second communication from the device, wherein the second communication received from the device includes:
      the session identifier that identifies the first communication; and
      a device identifier of the device, wherein the device identifier is generated by the device in response to a determination that the first internet protocol address matches at least one entry in a list of internet protocol addresses, wherein the device identifier is randomly generated and is different from the second internet protocol address, and wherein the device identifier originates from the device;
   linking the first communication with the device identifier based on the session identifier to generate an identification for the device; and
   analyzing the first communication with respect to the device identifier to produce an analyzed first communication with the identified device.

2. The method of claim 1, wherein:
the session identifier is a first session identifier; and
the method further comprises, by the processor:
   storing the analyzed first communication;
   receiving a third communication from the device, wherein the third communication includes the requests to interact with the web page, a second session identifier associated with the third communication, and a third internet protocol address associated with the device;
receiving a fourth communication from the device, wherein the fourth communication received from the device includes the device identifier and the second session identifier;
linking the third communication with the device identifier based on the second session identifier to generate another identification of the device; and
analyzing the third communication with respect to the first communication and with respect to the device identifier to produce an analyzed third communication with the identified device.

3. The method of claim 2, further comprising comparing the analyzed third communication with the analyzed first communication.

4. The method of claim 2, wherein the second internet protocol address is different from the third internet protocol address.

5. The method of claim 1, wherein:
the session identifier is a first session identifier;
the device identifier is a first device identifier;
the identification for the device is a first identification for the device;
and the method further comprises, by the processor:
storing the analyzed first communication;
receiving a third communication from the device, wherein the third communication includes the requests to interact with the web page, a second session identifier associated with the third communication, and a third internet protocol address associated with the device;
receiving a fourth communication from the device, wherein the fourth communication received from the device includes a second device identifier different from the first device identifier, and wherein the fourth communication includes the second session identifier;
linking the third communication with the device identifier based on the second session identifier to generate a second identification for the device; and
analyzing the third communication with respect to the first communication and with respect to the second device identifier to produce an analyzed third communication.

6. The method of claim 1, wherein the interaction relates to clicks on the web page.

7. A method to send a first communication, the method comprising, by a device:
sending the first communication from the device to a processor, wherein the processor is at a first internet protocol address, the first communication includes requests to interact with a web page, a session identifier that identifies the first communication, and a second internet protocol address associated with the device;
comparing the first internet protocol address to a list of internet protocol addresses;
determining that the first internet protocol address matches at least one entry in the list of internet protocol addresses;
generating a device identifier for the device in response to the determination that the first internet protocol address matches the at least one entry in the list of internet protocol addresses, wherein the device identifier is randomly generated and is different from the second internet protocol address; and
sending a second communication from the device to the processor, wherein the second communication includes the device identifier and the session identifier, and wherein the session identifier identifies the first communication.

8. The method of claim 7, wherein:
the session identifier is a first session identifier; and
the method further comprises, by the device:
sending a third communication from the device, wherein the third communication includes the requests to interact with the web page, a second session identifier associated with the third communication, and a third internet protocol address associated with the device, and wherein the third internet protocol address is different from the second internet protocol address; and
sending a fourth communication from the device, wherein the fourth communication includes the device identifier and the second session identifier.

9. The method of claim 7, wherein:
the session identifier is a first session identifier;
the device identifier is a first device identifier;
and the method further comprises, by the device:
generating a second device identifier different from the first device identifier;
sending a third communication from the device, wherein the third communication includes the requests to interact with the web page, a second session identifier associated with the third communication, and a third internet protocol address associated with the device, and wherein the third internet protocol address is different from the second internet protocol address; and
sending a fourth communication from the device, wherein the fourth communication includes the second device identifier and the second session identifier.

10. The method of claim 7, further comprising changing the device identifier based on a schedule.

11. The method of claim 7, wherein sending the first and second communications includes sending the first and second communications over a cellular network.

12. A system configured to analyze a first communication from a device, the system comprising:
the device, wherein the device includes a first processor; and
a second processor configured to be in communication with the device over a network,
wherein the first processor is configured to:
send the first communication from the device to the second processor, wherein the second processor is at a first internet protocol address, and wherein the first communication includes requests to interact with a web page, a session identifier that identifies the first communication, and a second internet protocol address associated with the device;
compare the first internet protocol address to a list of internet protocol addresses;
determine that the first internet protocol address matches at least one entry in the list of internet protocol addresses;
generate a device identifier for the device in response to the determination that the first internet protocol address matches the at least one entry in the list of internet protocol addresses, wherein the device identifier is randomly generated and is different from the second internet protocol address; and
send a second communication from the device to the second processor at the first internet protocol address, wherein the second communication includes the device identifier and the session identifier that identifies the first communication, and
wherein the second processor is configured to:
receive the first communication from the device;
receive the second communication from the device;
link the first communication with the device identifier based on the session identifier to generate an identification for the device; and
analyze the first communication with respect to the device identifier to produce an analyzed first communication with the identified device.

13. The system of claim 12, wherein:
the session identifier is a first session identifier;
and the second processor is further configured to:
store the analyzed first communication;
receive a third communication from the device, wherein the third communication includes requests to interact with the web page, a second session identifier that identifies the third communication, and a third internet protocol address associated with the device;
receive a fourth communication from the device, wherein the fourth communication received from the device includes the device identifier and the second session identifier;
link the third communication with the device identifier based on the second session identifier to generate another identification for the device; and
analyze the third communication with respect to the first communication and with respect to the device identifier to produce an analyzed third communication.

14. The system of claim 12, wherein the interaction relates to clicks on the web page.

15. The system of claim 12, wherein the first processor is further configured to change the device identifier based on a schedule.

16. The system of claim 12, wherein the first processor is configured to generate the device identifier based on an application program interface provided by the second processor.

17. The system of claim 12, wherein:
the session identifier is a first session identifier;
the device identifier is a first device identifier;
the internet protocol address is a first internet protocol address;
and the first processor is further configured to:
generate a second device identifier different from the first device identifier;
send a third communication from the device, wherein the third communication includes requests to interact with the web page, a second session identifier associated with the third communication, and a third internet protocol address associated with the device, and wherein the third internet protocol address is different from the second internet protocol address; and
send a fourth communication from the device, wherein the fourth communication includes the second device identifier and the second session identifier.

18. The system of claim 12, wherein the network includes a cellular network.

* * * * *